United States Patent
Gandhi et al.

(10) Patent No.: US 9,727,494 B1
(45) Date of Patent: Aug. 8, 2017

(54) METHOD AND SYSTEM FOR COMMUNICATION BETWEEN A COMPUTING DEVICE AND A PERIPHERAL DEVICE

(71) Applicant: QLOGIC, Corporation, Aliso Viejo, CA (US)

(72) Inventors: Rajendra R. Gandhi, Laguna Niguel, CA (US); Bradley S. Sonksen, Rancho Santa Margarita, CA (US); Kuangfu David Chu, Irvine, CA (US); Vi Chau, Laguna Niguel, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 704 days.

(21) Appl. No.: 13/649,391

(22) Filed: Oct. 11, 2012

(51) Int. Cl.
*G06F 13/12* (2006.01)
*G06F 13/24* (2006.01)

(52) U.S. Cl.
CPC ............ *G06F 13/126* (2013.01); *G06F 13/24* (2013.01)

(58) Field of Classification Search
CPC ............................... G06F 13/24; G06F 13/126
USPC ..... 710/22, 23, 58, 305, 308, 313, 260, 263, 710/268
See application file for complete search history.

(56) References Cited

U.S. PATENT DOCUMENTS

| | | | |
|---|---|---|---|
| 5,548,762 A * | 8/1996 | Creedon et al. | 710/260 |
| 5,761,427 A * | 6/1998 | Shah et al. | 709/223 |
| 6,434,630 B1 * | 8/2002 | Micalizzi et al. | 710/5 |
| 6,564,271 B2 * | 5/2003 | Micalizzi, Jr. | G06F 13/126 710/20 |
| 7,478,186 B1 * | 1/2009 | Onufryk et al. | 710/263 |
| 7,689,738 B1 * | 3/2010 | Williams et al. | 710/52 |
| 7,721,033 B2 * | 5/2010 | Duckman | G06F 9/4812 710/260 |
| 7,949,813 B2 * | 5/2011 | Mizrachi et al. | 710/267 |
| 8,412,871 B2 * | 4/2013 | Kyusojin et al. | 710/260 |

* cited by examiner

*Primary Examiner* — Brian Misiura
(74) *Attorney, Agent, or Firm* — Klein, O'Neill & Singh, LLP

(57) ABSTRACT

Methods and systems for a device interfacing with a computing system are provided. The device is configured to send an input/output status block (IOSB) and an interrupt message to the processor of a computing system interfacing upon completion of an operation. The device generates the interrupt message while the IOSB is waiting to be transmitted; and transmits the IOSB to the processor, followed by the interrupt message, using a same data path for both the IOSB and the interrupt message. Furthermore, the device is configured to detect a request from the processor of the computing system interfacing to clear an interrupt status maintained by the device at a hardware location; send a message to the processor to de-assert the interrupt status and in parallel, clear the hardware location to clear the interrupt status such that the computing system can transfer information to the device for a next operation.

18 Claims, 5 Drawing Sheets

US 9,727,494 B1

METHOD AND SYSTEM FOR COMMUNICATION BETWEEN A COMPUTING DEVICE AND A PERIPHERAL DEVICE

TECHNICAL FIELD

The present invention relates to computing systems.

BACKGROUND

Computing systems are commonly used today. A computing system often communicates with a peripheral device for performing certain functions, for example, reading and writing information. Continuous efforts are being made to improve communication between computing systems and peripheral devices.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for sending an input/output status block (IOSB) and an interrupt message to a processor of a computing system interfacing with a device is provided. A processor of the device generates the IOSB for the processor of the computing system in response to a command from the computing system for a task performed by the device. The method includes using a direct memory access (DMA) module of the device to configure a DMA channel for sending both the IOSB and the interrupt message to the processor, such that the interrupt message is transmitted to the processor of the computing system immediately after the IOSB; generating the interrupt message while the IOSB is waiting to be transmitted; and transmitting the IOSB to the processor, followed by the interrupt message, using a same data path for both the IOSB and the interrupt message.

In another embodiment, a system having a computing system with a processor executing instructions and interfacing with a device configured to perform an operation upon receiving a command from the computing system is provided. The device is configured to send an input/output status block (IOSB) and an interrupt message to the processor of a computing system interfacing upon completion of the operation; and the device uses a direct memory access (DMA) module to configure a DMA channel to send both the IOSB and the interrupt message, such that the interrupt message is transmitted to the processor of the computing system immediately after the IOSB. The device generates the interrupt message while the IOSB is waiting to be transmitted; and transmits the IOSB to the processor, followed by the interrupt message, using a same data path for both the IOSB and the interrupt message.

In yet another embodiment, a machine implemented message for managing interrupts is provided. The method includes detecting a request from a processor of a computing system interfacing with a device to clear an interrupt status maintained by the device at a hardware location; and sending a message by the device to the processor to de-assert the interrupt status and in parallel, clearing the hardware location to clear the interrupt status such that the computing system can send transfer information to the device for a next operation.

In another embodiment, a system having a computing system having a processor executing instructions and interfacing with a device configured to perform an operation upon receiving a command from the computing system is provided. The device is configured to detect a request from the processor of the computing system interfacing to clear an interrupt status maintained by the device at a hardware location; send a message to the processor to de-assert the interrupt status and in parallel, clear the hardware location to clear the interrupt status such that the computing system can transfer information to the device for a next operation.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
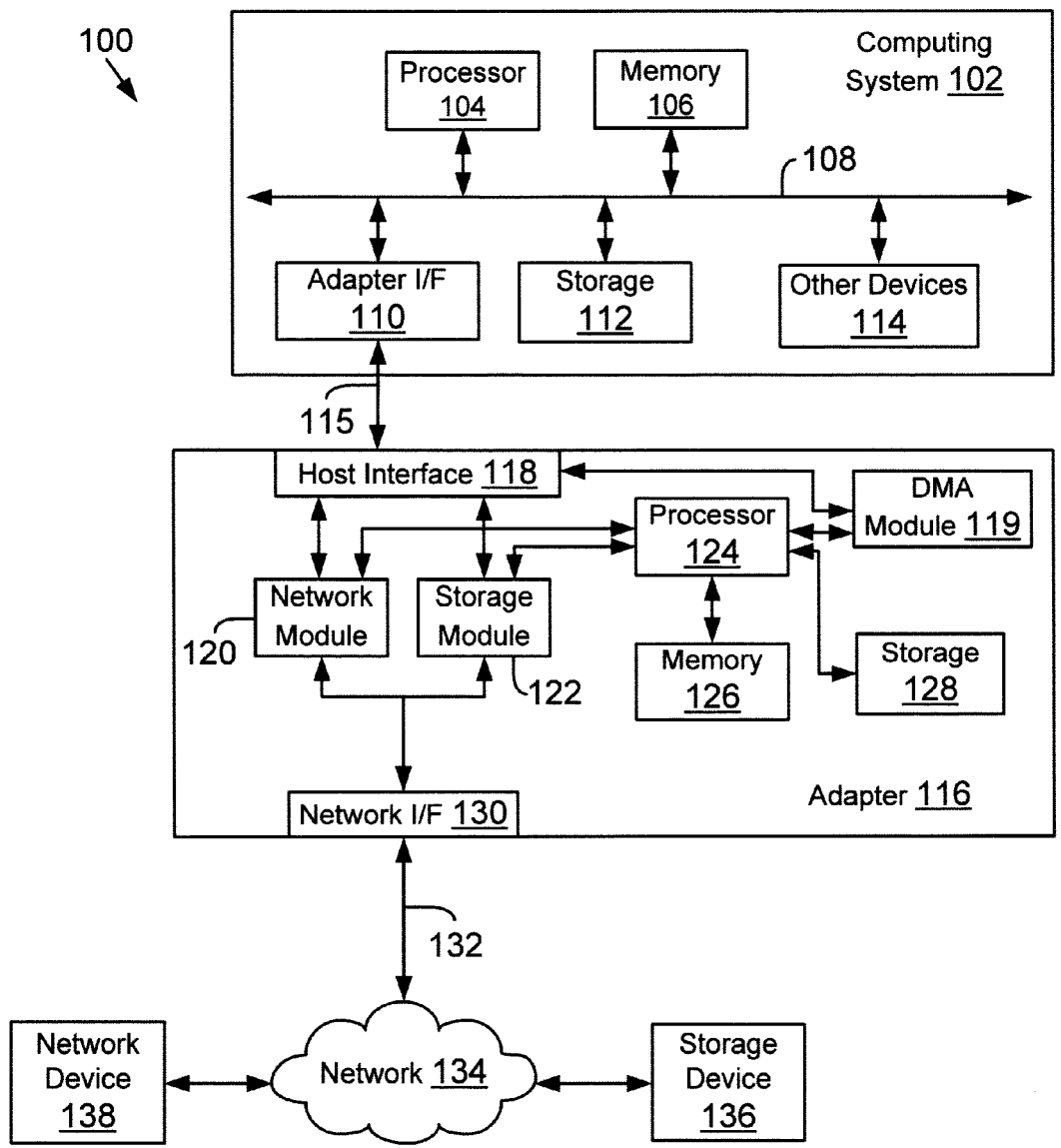
FIG. 1A is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Methods and systems for a device interfacing with a computing system are provided. The device is configured to send an input/output status block (IOSB) and an interrupt message to the processor of a computing system interfacing upon completion of an operation. The device uses a direct memory access (DMA) module to configure a DMA channel to send both the IOSB and the interrupt message, such that the interrupt message is transmitted to the processor of the computing system immediately after the IOSB. The device generates the interrupt message while the IOSB is waiting to be transmitted; and transmits the IOSB to the processor, followed by the interrupt message, using a same data path for both the IOSB and the interrupt message. In another aspect, the device is configured to detect a request from the processor of the computing system interfacing to clear an interrupt status maintained by the device at a hardware location; send a message to the processor to de-assert the interrupt status and in parallel, clear the hardware location to clear the interrupt status such that the computing system can transfer information to the device for a next operation.

System: FIG. 1A is a block diagram of a system 100 configured for use with the present embodiments. The system 100 may include one or more computing system 102 (may also be referred to as "host system 102") coupled to another device via a link 115, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 facilitates the ability of the computing system 102 to interface with the adapter 116 via the link 115. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 116 shown in FIG. 1A may be configured to operate as an FCOE adapter and may be referred to as FCOE adapter 116. QLogic Corporation, the assignee of the present application, provides one such adapter. The illustrated adapter 116, however, does not limit the scope of the present embodiments. The present embodiments may be practiced with adapters having different configurations.

Referring back to FIG. 1A, adapter 116 interfaces with the computing system 102 via the link 115 and a host interface 118. In one embodiment, the host interface 118 may be a PCI Express interface having logic/circuitry for sending and receiving PCI-Express packets.

The adapter 116 may also include a processor 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 112 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels (not shown) for managing access to link 115. The DMA channels are typically used to move control structures such as input/output control blocks (IOCBs), input/output status blocks (IOSBs) and data between host system memory 106 and the adapter memory 126.

Figure 1B:
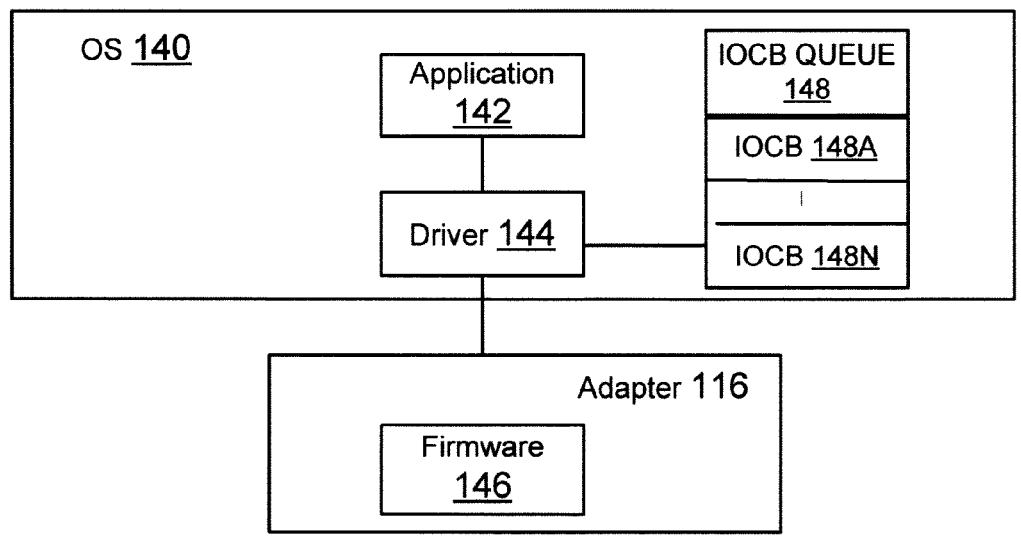
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O) at another storage device. The driver 144 processes the request and communicates with firmware 146 executed by processor 124 of adapter 116. A component of adapter 116 then processes the request.

Typically for managing data transfers across link 115, the following process steps are typically used: an IOCB is first generated by the driver 144 and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. Both IOCB fetch and data transfer operations are performed using DMA operations via DMA channels. Based on the IOCB, adapter 116 executes the operations that may be needed. Adapter 116 then uses DMA operation to send a status block (IOSB) to processor 104 indicating the completion of IOCB execution and associated data transfer. The adapter 116 then sends an interrupt message to the host processor 104 to indicate completion of IOCB execution and posting of the IOSB status in the host system memory 106 so that it can process IOSBs and notify application 142 of the completion of the data transfer process Since the interrupt message is sent to notify host processor 104 of the posting of the IOSB in system memory 106, both IOSB and the interrupt should be in order i.e. IOSB needs to be received first followed by the interrupt to avoid I/O corruption.

The PCIe standard supports three interrupt modes: INTx, Message Signaled Interrupt (MSI) and the MSI-X protocol, which is an extension of MSI. INTx is the oldest interrupt protocol where interrupt lines provided by a PCI bus can be shared.

MSI allows A device to write a small amount of data to a special address in memory space. The device then delivers a corresponding interrupt to the host processor 104. The MSI protocol was defined by the PCIe standard, version 2.2 that permits a device to allocate 1, 2, 4, 8, 16 or 32 interrupts. The device is programmed with an address to write to (generally a control register in an interrupt controller), and a 16-bit data word to identify it. The interrupt number is added to the data word to identify the interrupt.

The MSI-X defined in the PCIe standard, version 3.0 that permits a device to allocate up to 2048 interrupts. MSI_X uses interrupt vectors. An interrupt vector is a data structure having an address (pointing to a host memory location) and a data value. When adapter 116 issues a memory write transaction, processor 104 identifies the associated interrupt vector. The address and data fields are typically stored at memory 126 by adapter 116.

In conventional systems, the IOSB may be generated via a DMA channel, while an interrupt is typically sent via a control path. It is desirable to receive the IOSB and the interrupt such that processor 104 is better able to manage IOCBs. This becomes challenging when different paths are used to send the IOSBs and interrupts. The system of FIG. 1C and the process flow of FIG. 2 as described below in detail, provide a better solution than what conventional systems use today i.e. separate paths for IOSBs and interrupts.

Figure 3:
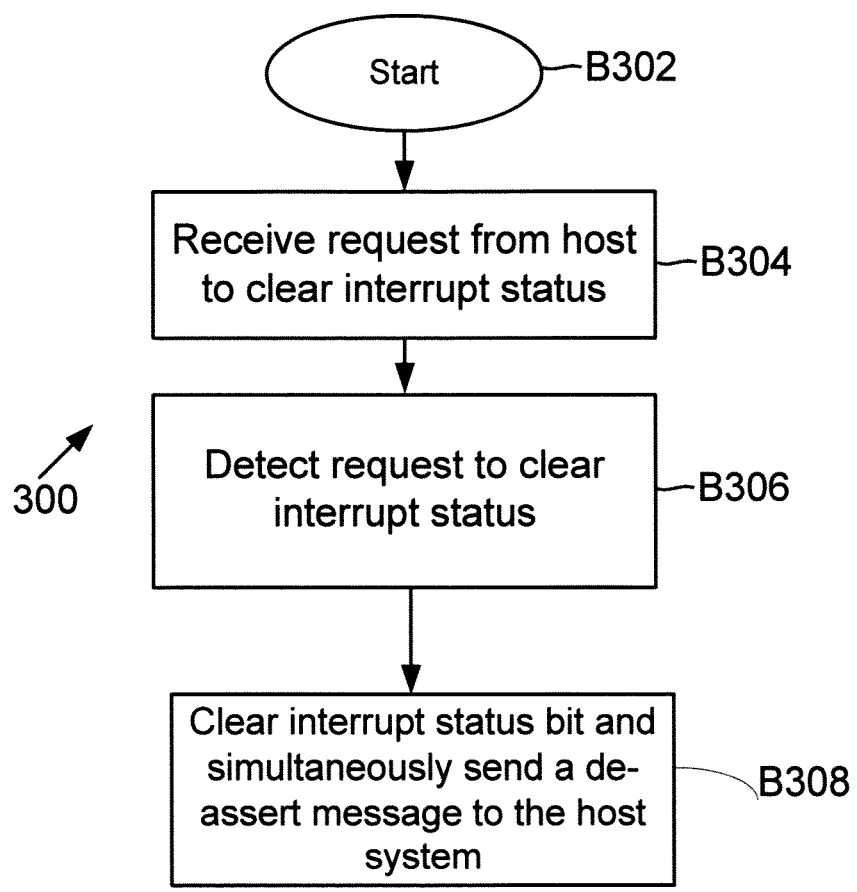
FIG. 3 shows process for using the system of FIG. 1D, according to one embodiment.

Conventional systems also have at least another challenge, especially when legacy INTx messages are used. The INTx protocol involves using an assert and de-assert message to complete interrupt processing. The assert message is typically sent by the adapter 116 to the driver 144 after posting the IOSB in the host system memory 106. The interrupt to the driver 144 causes driver 144 to enter an interrupt service routine (ISR) to process the posted IOSBs. At the end of the ISR after the driver 144 has completed the processing of the IOSBs, it writes to a register at adapter 116 to clear the interrupt and then exits the ISR. The interrupt de-assert message is triggered by the adapter 116 in response to the driver 144 writing to the register to clear the interrupt status in the adapter. Driver 144 typically has to wait for the de-assert message before it can exit interrupt service routine (ISR) and continue processing more I/Os. This latency is undesirable, especially in high bandwidth operations. The system of FIG. 1D and process flow of FIG. 3 provide a solution to overcome the "de-assert" latency challenge for legacy systems using the INTx protocol, as described below in detail.

Figure 1C:
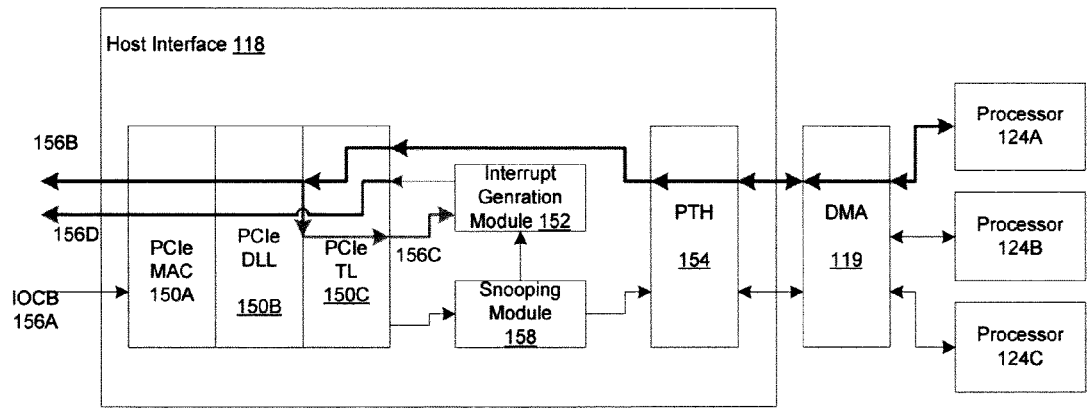
FIG. 1C shows an example of a system for sending status blocks and interrupts, according to one embodiment.

FIG. 1C shows a system for processing interrupt messages and IOSBs, according to one embodiment. Host interface 118 having a plurality of modules is configured to process PCIe packets. Host interface 118 may include a PCIe media access control (MAC) layer (also referred to as PHY or PHY layer) 150A for receiving and sending messages via link 115. Host interface 118 includes a PCIe data link layer (referred to as DLL) 150B between a PCIe transaction layer (referred to as TL) 150C and PHY 150A. PHY 150A, DLL 150B and TL 150C are defined by the PCIe specification.

Host interface 118 also includes a PCI-Express Transaction Handler (PTH) 154 that interfaces with the DMA module 119 and TL 150C to send and receive information via link 115. PTH 154 performs various functions including error checking and others.

PCI-Express uses a packet-based protocol to exchange information between TL 150A and a TL (not shown) at the adapter interface 110. Transactions are carried out using requests and completions. Completions are used only when required, for example, to return read data or to acknowledge completion of a request. On the transmit side, packets flow from the TL 150C to PHY 150A. On the receive side, packets are processed by the PHY layer 150A and sent to TL 150C for processing. TL 150 C assembles and disassembles Transaction Layer Packets ("TLPs"). TLPs are used to communicate transactions, such as read and write and other type of events.

The system of FIG. 1C shows more than one processor 124 (labeled as 124A-124C) for adapter 116. The embodiments described herein are not limited to any particular number of processors. Processors 124A-124C interface with the DMA module 119 to send and receive data and messages via link 115.

As described above, driver 144 generates an IOCB for an I/O request and places the IOCB at the IOCB queue 148. The IOCB (for example, 156A) is then received by adapter 116 and provided to one of the processors, for example, 124A. In response to the IOCB 156A, processor 124A performs an operation, for example, sends data to the host processor 104 or sends information out via network link 132. Once the operation is performed, processor 124A sends an IOSB shown by line 156B. The IOSB is sent using the DMA module 119, PTH 154, TL 150C, DLL 150B and PHY layer 150A. In one embodiment, when the IOSB is queued at TL 150C, information for generating an interrupt message is provided to an interrupt generation module 152 as indicated by line 156C.

The interrupt generation module 152 generates an interrupt, which is queued at TL 150C, such that the interrupt can be sent immediately after the IOSB is transmitted through the same TL datapath 150C as the IOSB was previously sent. The IOSB transmission is indicated by line 156B and the interrupt transmission is indicated by line 156D. Because, of pipelining the IOSB and generation of the interrupt message, the interrupt message is transmitted immediately after the IOSB. This maintains the preferred order of sending IOSBs and interrupts as part of IOCB processing.

In one embodiment, the same data path is used to send the IOSB and the interrupt signals, vis-à-vis the conventional approach where the IOSBs are sent using a data path and interrupts are sent using a different control path where relative ordering is not guaranteed.

Figure 2:
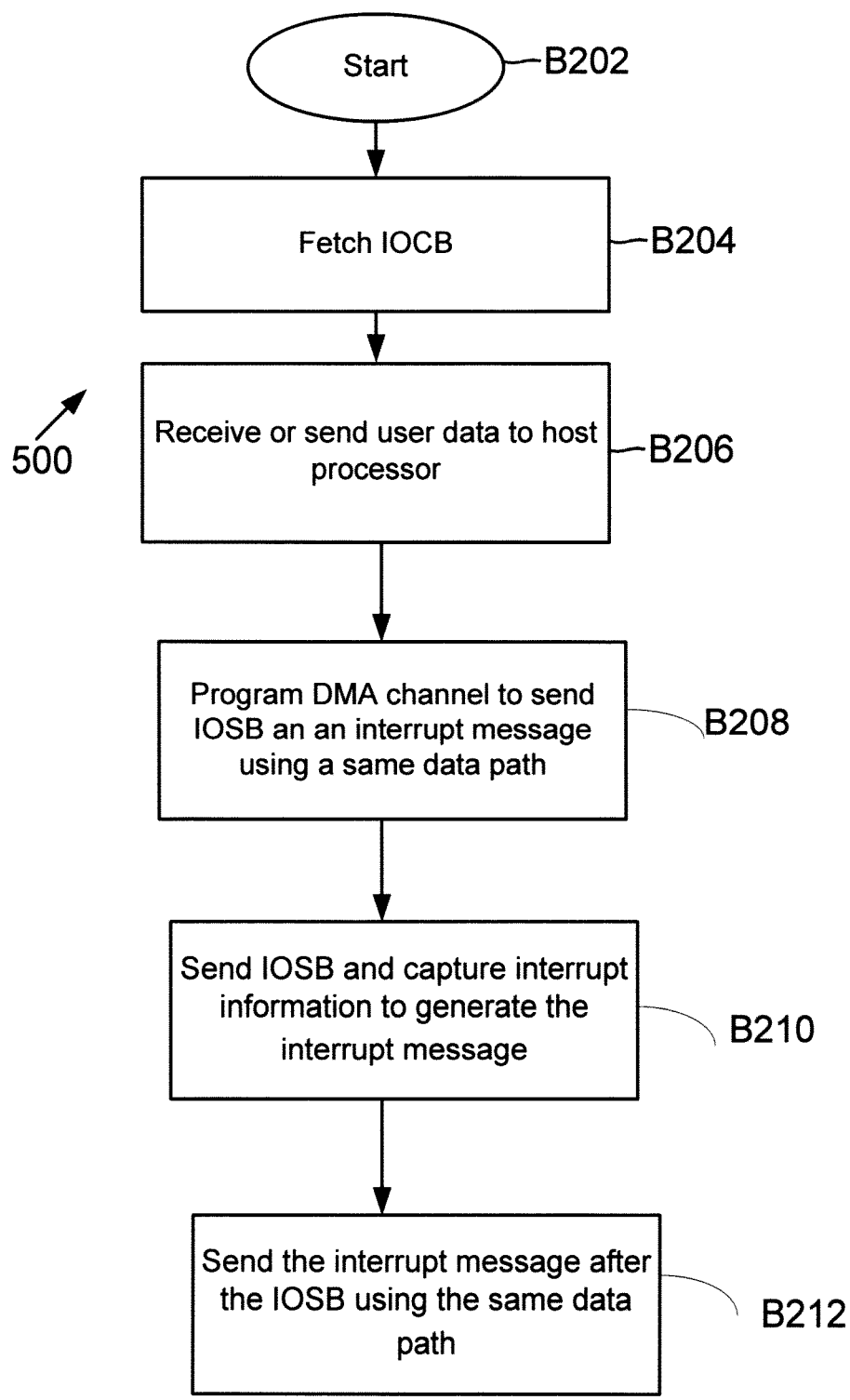
FIG. 2 shows a process for using the system of FIG. 1C, according to one embodiment.

FIG. 2 shows a process 200 for using the system of FIG. 1C, according to one embodiment. The process begins in block 202, when processor 104 places an IOCB 156A at memory 106. The IOCB 156A indicates whether data is to be read from a location or written to a location. The IOCB 156A may be generated by driver 144 and placed at the IOCB queue 148 location, for example, 148A-148N.

After the IOCB 156A is queued, the firmware 146 fetches the IOCB in block B204. The IOCB 156A may be fetched using the DMA module 119 and a DMA channel (not shown) via link 115. In response to the IOCB, in block B206, one of the processors 124A-124B (for example, processor 124A) performs the appropriate operation, i.e. provides user data to processor 104 or writes user data on behalf of processor 104 at another location for example, a storage device (not shown).

In block B208, processor 124A programs a DMA channel (not shown) for DMA module 119 to send out an IOSB and an interrupt message. Processor 124A programs a function number, a transfer length for the IOSB and a starting address where the IOSB is stored at adapter 116. The function number defines a PCIe function. To send the interrupt message using the same data path, processor 124A sets an interrupt message flag associated with the IOSB. This will trigger sending the interrupt after the IOSB. Processor 124A provides the interrupt message type i.e. if the interrupt is set to an interrupt or clear the interrupt. Processor 124A may further provide a vector number for the associated interrupt, when the MSI-X protocol is being used by adapter 116 to communicate with processor 104.

The IOSB is sent first in block B210, as shown by line 156B. The interrupt message information is captured for the interrupt generation module 152 as indicated by line 156C. The interrupt generation module 152 generates an interrupt message that is queued at TL 150C. Using the same data path as IOSB, the interrupt is then sent in block B212 as shown by line 156D in FIG. 1D.

The system of FIG. 1C and process of FIG. 2 ensure that the IOSB and the interrupt for an IOCB are delivered using the same data path in a desired order i.e. an interrupt following the IOSB. This allows driver 144 to manage the IOCBs better and improves overall efficiency in processing I/O operations i.e. reading and writing data for application 142.

Figure 1D:
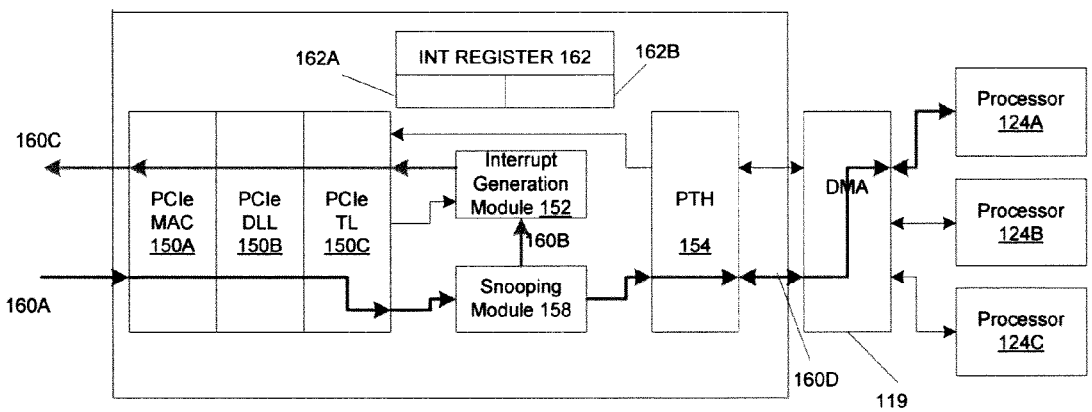
FIG. 1D shows an example of a system for clearing interrupts, according to one embodiment.

FIG. 1D shows an example of a system for handling the legacy, INTx type interrupts, according to one embodiment. The system includes an interrupt register 162 that stores a first bit value (162A) that sets an interrupt and another bit value (162B) to clear the interrupt module. It is noteworthy that an interrupt may be set by setting one bit value and cleared by using another bit value.

The system of FIG. 1D also includes a snooping module 158 in host interface 118. The snooping module 158 obtains information from a request 160A after the request has been validated by TL 150C. The snooping module 158 looks for a memory write request to a specific address and data for the interrupt register 162. The information from request 160A is provided to the interrupt generation module 152, as shown by line 160B. Thereafter, the interrupt status register bit at the INTx register 162 is cleared. The interrupt status bit for the PCIe function is also cleared (not shown) at the same time. If no other function is assigned to the same INTx wire, then the de-assert message is sent, as shown by line 160C. Line 160D shows completion of request 160A to clear the interrupt bits at adapter 116.

FIG. 3 shows a process 300 for using the system of FIG. 1D, according to one embodiment. The process begins in block B302. In block B304, host interface 118 receives a request 160A. The request may be a memory write request to a specific address, for example, to write to interrupt register 162. In block B306, snooping module 158 detects the request as one to clear an interrupt status. Snooping module 158 is able to detect the request based on the memory address and a current status of the interrupt register 162. For example, snooping module 158 obtains the status of the interrupt register 162 and it is aware that an interrupt is currently set. When snooping module 158 detects a write operation to the interrupt register 162, it infers that the request 160A is to clear the interrupt.

Thereafter, in block B308, the interrupt is cleared as indicated by line 160D and a de-assert message is sent to driver 144, as indicated by line 160C. The de-assert message is sent if no other function assigned to the same INTx line is active. It is noteworthy that the two operations "clearing the register" and sending the de-assert message are performed in parallel, unlike conventional systems where the two operations occur in sequence.

The system of FIG. 1D and the process of FIG. 3 reduce latency in providing the de-assert message. Thus the driver 144 is able to exit the ISR quickly and is able to move on to other tasks related to I/O processing. This improves the overall throughout and efficiency for processing input/output operations.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method for sending an input/output status block (IOSB) and an interrupt message to a processor of a computing system interfacing with a device, comprising:

placing an input/output command block (IOCB) by the processor of the computing system at a memory of the computing system with a command for the device to perform a task;

retrieving the IOCB with the command by the device from the memory of the computing system using a direct memory access (DMA) operation;

executing a task associated with the command by the device from one of reading and writing data to and from a networked storage device;

configuring a DMA channel by a processor of the device for sending the IOSB indicating a status of the IOCB and for sending the interrupt message immediately after the IOSB using a same data path used for the interrupt message and the IOSB;

generating the IOSB by the processor of the device;

queuing by the device, the IOSB for transmission using the DMA channel;

setting by the device, an indicator associated with the IOSB that triggers sending the interrupt message associated with the IOSB immediately after the IOSB is sent using the same data path;

retrieving information by the device for generating the interrupt message after the IOSB is queued for transmission to the processor of the computing system;

generating the interrupt message by the device while the IOSB is waiting to be transmitted;

queuing the interrupt message behind the IOSB by the device; and transmitting the IOSB to the processor of the computing system by the device, followed immediately by the interrupt message, using the same data path for sending both the IOSB and the interrupt message to maintain an order between the IOSB and the interrupt message such that the interrupt message is sent after the IOSB.

2. The method of claim 1, wherein the device is a PCI-Express device.

3. The method of claim 1, wherein the device is a host bus adapter coupled to the computing system using a PCI-Express link.

4. The method of claim 1, wherein the device is a converged network adapter coupled to the computing system using a PCI-Express link.

5. The method of claim 1, wherein the device is an adapter coupled to the computing system using a PCI-Express link.

6. The method of claim 1, wherein an interrupt generation module at a host interface module generates the interrupt message for the processor of the computing system.

7. A non-transitory, machine readable storage medium having stored thereon instructions for performing a method for sending an input/output status block (IOSB) and an interrupt message to a processor of a computing system interfacing with a device, comprising machine executable code which when executed by at least one machine, causes the machine to:

place an input/output command block (IOCB) by the processor of the computing system at a memory of the computing system with a command for the device to perform a task;

retrieve the IOCB with the command by the device from the memory of the computing system using a direct memory access (DMA) operation;

execute a task associated with the command by the device from one of reading and writing data to and from a networked storage device;

configure a DMA channel by a processor of the device for sending the IOSB indicating a status of the IOCB and for sending the interrupt message immediately after the IOSB using a same data path used for the interrupt message and the IOSB;
generate the IOSB by the processor of the device;
queue by the device, the IOSB for transmission using the DMA channel;
set by the device an indicator associated with the IOSB that triggers sending the interrupt message associated with the IOSB immediately after the IOSB is sent using the same data path;
retrieve information by the device for generating the interrupt message after the IOSB is queued for transmission to the processor of the computing system;
generate the interrupt message by the device while the IOSB is waiting to be transmitted;
queuing the interrupt message behind the IOSB by the device; and
transmit the IOSB to the processor of the computing system, followed immediately by the interrupt message, using the same data path for sending both the IOSB and the interrupt message to maintain an order between the IOSB and the interrupt message such that the interrupt message is sent after the IOSB.

8. The machine readable storage medium of claim 7, wherein the device is a PCI-Express device.

9. The machine readable storage medium of claim 7, wherein the device is a host bus adapter coupled to the computing system using a PCI-Express link.

10. The machine readable storage medium of claim 7, wherein the device is a converged network adapter coupled to the computing system using a PCI-Express link.

11. The machine readable storage medium of claim 7, wherein the device is an adapter coupled to the computing system using a PCI-Express link.

12. The machine readable storage medium of claim 7, wherein an interrupt generation module at a host interface module generates the interrupt message for the processor of the computing system.

13. A system, comprising:
a computing system having a memory and a processor; and
a device having a processor for accessing a storage device via a network connection;
wherein the processor of the computing system places an input/output command block (IOCB) at the memory of the computing system with a command for the device to perform a task; and
wherein the device:
retrieves the IOCB with the command from the memory of the computing system using a direct memory access (DMA) operation;
executes a task associated with the command from one of reading and writing data to and from a networked storage device;
configures a DMA channel for sending an input/output status block (IOSB) indicating a status of the IOCB and for sending an interrupt message immediately after the IOSB using a same data path used for the interrupt message and the IOSB;
generates the IOSB and queues the IOSB for transmission using the DMA channel;
sets an indicator associated with the IOSB that triggers sending the interrupt message associated with the IOSB immediately after the IOSB is sent using the same data path;
retrieves information for generating the interrupt message after the IOSB is queued for transmission to the processor of the computing system;
generates the interrupt message while the IOSB is waiting to be transmitted; queues the interrupt message behind the IOSB; and
transmits the IOSB to the processor of the computing system, followed immediately by the interrupt message, using the same data path for sending both the IOSB and the interrupt message to maintain an order between the IOSB and the interrupt message such that the interrupt message is sent after the IOSB.

14. The system of claim 13, wherein the device is a PCI-Express device.

15. The system of claim 13, wherein the device is a host bus adapter coupled to the computing system using a PCI-Express link.

16. The system of claim 13, wherein the device is a converged network adapter coupled to the computing system using a PCI-Express link.

17. The system of claim 13, wherein the device is an adapter coupled to the computing system using a PCI-Express link.

18. The system of claim 13, wherein an interrupt generation module at a host interface module generates the interrupt message for the processor of the computing system.

\* \* \* \* \*